ис012534324B2

(12) United States Patent
Ebhardt et al.

(10) Patent No.: US 12,534,324 B2
(45) Date of Patent: Jan. 27, 2026

(54) METHOD FOR CONNECTING TAPES, TAPE CONNECTING DEVICE, PROCESSING SYSTEM AND USE

(71) Applicant: Georg Sahm GmbH & Co. KG, Eschwege (DE)

(72) Inventors: Heiko Ebhardt, Meinhard-Jestaedt (DE); Ernst Döring, Schimberg (DE); Sascha Möbs, Meissner (DE)

(73) Assignee: Georg Sahm GmbH & Co. KG, Eschwege (DE)

( * ) Notice: Subject to any disclaimer, the term of this patent is extended or adjusted under 35 U.S.C. 154(b) by 300 days.

(21) Appl. No.: 17/542,559

(22) Filed: Dec. 6, 2021

(65) Prior Publication Data

US 2022/0089397 A1   Mar. 24, 2022

Related U.S. Application Data

(63) Continuation of application No. PCT/EP2020/065221, filed on Jun. 2, 2020.

(30) Foreign Application Priority Data

Jun. 6, 2019 (EP) .................................... 19178765

(51) Int. Cl.
*B65H 21/02* (2006.01)
*B42D 25/355* (2014.01)
(Continued)

(52) U.S. Cl.
CPC ........... *B65H 21/02* (2013.01); *B42D 25/355* (2014.10); *B65H 23/26* (2013.01); *B65H 27/00* (2013.01);
(Continued)

(58) Field of Classification Search
CPC ........ B65H 2555/11; B65H 2301/4633; B65H 2301/46414; B65H 2301/4631;
(Continued)

(56) References Cited

U.S. PATENT DOCUMENTS 1,861,823 A * 6/1932 Smith ................ B65H 19/1831
242/555.1
3,065,782 A * 11/1962 Vergobbi ........... B65H 19/1873
83/210

(Continued)

FOREIGN PATENT DOCUMENTS

DE    2 119 410 A1    12/1971
DE    33 36 202 A1    5/1985
(Continued)

OTHER PUBLICATIONS

Written Opinion of the International Searching Authority for PCT/EP2020/065221.

*Primary Examiner* — Anna M Momper
*Assistant Examiner* — Henrix Soto
(74) *Attorney, Agent, or Firm* — The Sladkus Law Group

(57) ABSTRACT

A tape connecting device (1) and a method for connecting a first tape to a second tape for providing a tape string. In the tape connecting device (1) when continuously conveying the first tape an end section of the first tape is connected to a start section of the second tape by an adhesive connection by a liquid (in particular water) arranged in a connecting section. Furthermore, the invention relates to a method for connecting two tapes, a processing system and a use of a method. The inventive tape connecting device (1) and the method can in particular be used for a continuous provision of a security tape for a security document as a banknote.

6 Claims, 10 Drawing Sheets

(51) Int. Cl.
*B65H 23/26* (2006.01)
*B65H 27/00* (2006.01)

(52) U.S. Cl.
CPC .............. *B65H 2301/5151* (2013.01); *B65H 2405/584* (2013.01); *B65H 2555/11* (2013.01)

(58) Field of Classification Search
CPC .. B65H 2701/11332; B65H 2701/1912; B65H 2701/172; B65H 2701/175; B65H 19/1826; B65H 19/286; B65H 21/00; B65H 39/16; B65H 23/038; B65H 37/02; B65H 37/04; B65H 43/00; B65H 19/18; B65H 19/102; B65H 2301/41423; B65H 2301/41424; B65H 2301/4621
USPC .............................................. 242/556, 556.1
See application file for complete search history.

(56) References Cited

U.S. PATENT DOCUMENTS

| | | | |
|---|---|---|---|
| 3,089,661 A | | 5/1963 | Phillips |
| 3,586,006 A | * | 6/1971 | Wendt ............... A24C 5/20 131/910 |
| 3,607,507 A | | 9/1971 | Enos |
| 3,672,148 A | | 6/1972 | Benson |
| 3,719,542 A | * | 3/1973 | Schmitz ............ B21C 47/247 156/502 |
| 4,269,647 A | | 5/1981 | Verkinderen |
| 4,630,433 A | | 12/1986 | Premi |
| 4,722,489 A | * | 2/1988 | Wommer ........... B65H 19/1852 242/556.1 |
| 4,738,739 A | * | 4/1988 | Schoonderbeek . B65H 19/1852 156/159 |
| 4,878,982 A | * | 11/1989 | Ogata ............... B65H 19/1873 156/364 |
| 4,895,315 A | | 1/1990 | Salmela |
| 4,923,546 A | * | 5/1990 | Wheeler ............ B65H 19/1873 156/304.3 |
| 5,064,488 A | | 11/1991 | Dickey |
| 5,066,346 A | * | 11/1991 | Long .................. G03D 15/046 156/506 |
| 5,388,387 A | * | 2/1995 | McElvy .............. B65B 9/207 242/421 |
| 5,419,511 A | * | 5/1995 | Takahashi ........... B65H 19/286 242/532.3 |
| 5,441,211 A | * | 8/1995 | Ueda ..................... B65H 19/26 242/542.3 |
| 5,514,237 A | * | 5/1996 | Emenaker ........... B29C 66/8161 156/159 |
| 5,614,059 A | * | 3/1997 | Boriani ................... A24C 5/20 156/509 |
| 5,653,848 A | * | 8/1997 | Yamamoto ............. B65H 19/20 156/515 |
| 6,364,244 B1 | * | 4/2002 | Pasquale .............. B65H 19/181 242/554.6 |
| 6,880,604 B2 | * | 4/2005 | Keene ....................... B31F 5/06 156/304.3 |
| 6,978,816 B1 | * | 12/2005 | Byrne .................. B65H 19/286 156/159 |
| 7,776,172 B2 | * | 8/2010 | Tonohara ............ B65H 19/1836 242/555.6 |
| 8,088,238 B2 | * | 1/2012 | Hafner ................. B65H 19/102 156/159 |
| 10,766,728 B2 | | 9/2020 | Kummel |
| 2006/0272763 A1 | * | 12/2006 | Tiefel .................. B65H 19/1852 156/159 |
| 2010/0186879 A1 | | 7/2010 | Machamer |
| 2017/0137251 A1 | * | 5/2017 | Sato ....................... B65H 20/12 |
| 2018/0064160 A1 | * | 3/2018 | Gindrat .................. B65H 19/20 |

FOREIGN PATENT DOCUMENTS

| | | | | |
|---|---|---|---|---|
| DE | 35 40 324 A1 | | 6/1986 | |
| DE | 19612416 A1 | * | 10/1997 | ......... B65H 19/107 |
| DE | 102014108461 A1 | * | 12/2015 | ........ B65H 19/1852 |
| EP | 0 001 465 A1 | | 4/1979 | |
| EP | 1 209 115 A2 | | 5/2002 | |
| EP | 1 209 115 B1 | | 4/2005 | |
| GB | 2 101 561 A | | 6/1983 | |
| JP | S 57-156943 A | | 9/1982 | |
| JP | S 58-2165 A | | 1/1983 | |
| JP | S 60-61452 A | | 4/1985 | |
| JP | 2015-074451 A | | 4/2015 | |
| JP | 2017-533155 A | | 11/2017 | |
| WO | 2016059022 A1 | | 4/2016 | |
| WO | WO-2019022047 A1 | * | 1/2019 | ............ B29C 65/50 |

\* cited by examiner

METHOD FOR CONNECTING TAPES, TAPE CONNECTING DEVICE, PROCESSING SYSTEM AND USE

CROSS REFERENCE TO RELATED APPLICATIONS

This application is a continuation of International Application PCT/EP2020/065221 with an international filing date of Jun. 2, 2020 and claiming priority to co-pending European Patent Application No. EP 19 178 765.4 entitled "Method for joining strips, strip joining device, processing system and use of same", filed on Jun. 6, 2019.

FIELD OF THE INVENTION

When tapes can only be provided with a limited length (e. g. due to the used manufacturing process or due to the provision from a bobbin) and when in a processing process the tape should be processed with a tape string being longer than the provided length of the tape, it is required that an end section of a first tape is connected to a start section of a second tape so that a longer tape string formed by the two tapes is produced. It is possible that in this way a number of tapes is connected to each other for further increasing the length of the tape string. Also when in a conveying and/or processing process of a tape there is a fracture or a severing so that this tape forms an end section of a first tape (part) and a start section of a second tape (part) in the neighborhood of the severing or fracture, the use of a method for connecting an end section of a first tape to a start section of a second tape might be required.

The invention relates to a method for connecting an end section of a first tape to a start section of a second tape that can be used within this frame. Furthermore, the invention relates to a tape connecting device, a processing system and a new use.

One application field of the method and the tape connecting device (which is not mentioned with the aim to limit the present invention) are tapes embodied as strip-shaped security tapes for security documents as banknotes or admission tickets. Security tapes of this type serve for making forgery of the security document more difficult or impossible because it is difficult to counterfeit the security tape so that it is easy to identify an un-authorized copy. In security documents the security tape might be embedded into a carrier material, in particular into the paper material. The security tape might here be a tape made of plastic which is equipped with security features as holograms. The security tape is provided on a bobbin, unwound from the bobbin and then supplied to the processing process which is here the production of the security document. In the processing process the securing tape is embedded into the carrier material. A plurality of security documents can then be successively and continuously be produced which requires a continuous supply of the security tape. When the end of the security tape from a first bobbin supplying the security tape is reached, a new security tape from a second bobbin has to be introduced into the processing process. Advantageously, the insertion into the processing process is provided before the security tape has completely been unwound from the first bobbin and by connecting the end section of the security tape of the first bobbin to the start section of the security tape of the second bobbin. However, for that purpose it is required to interrupt the supply of the security tape and so the processing process. After the establishment of the connection and the restart of the supply (of the connecting section of the old security tape and the new security tape and subsequently only of the new security tape) and after the restart of the processing process then the connecting section of the two security tapes has to be separated in the further processing process (in some cases together with the security document wherein this connecting section is then arranged).

BACKGROUND OF THE INVENTION

DE 35 40 324 A1 (corresponding to U.S. Pat. No. 4,630, 433 A) discloses a method for connecting two textile threads by means of compressed air. Here, two textile threads consisting of a plurality of single twisted fibers are first untwisted at their ends. Subsequently, the two ends are spliced to each other by twisting. After the generation of the splicing connection the two textile threads are held together due to the friction force between the single fibers and due to the self-locking when being objected to a tensile load.

In the context of connecting a winding material by splicing when producing a cross-wound package EP 1 209 115 A2 proposes to heat the winding material in the region of a splicing head, the heating being advantageous for connecting different yarn types by splicing.

DE 33 36 202 A1 describes that it is known to connect two tapes formed by filament yarns by machines comprising automatic knotting devices, air splicers or mechanical splicers. The publication describes the disadvantage that the known connecting methods require that during the establishment of the connection the tapes have to rest which requires a stopping and a restart of the processing process to which the filament yarn is supplied. On this background DE 33 36 202 A1 proposes to supply a first yarn thread from a first bobbin via a thread eye, a slit yarn guide and a first splicing chamber with a subsequent thread guiding eye to a test device. A second yarn thread is taken from a second bobbin. The resting second yarn thread extends in a vertical plane below the first yarn thread. The loose end section of the second yarn thread is here held by a clamping device below the first yarn thread and upstream from the first splicing chamber. With the arrival of the end section of the first yarn thread a slide is moved vertically in upward direction. The slide carries an electrically actuated cutting device, a down-pulling device and a second splicing chamber arranged between two slit yarn guides. With the movement of the slide in upward direction the second yarn thread from above enters into the slit yarn guide carried by the slide and into the second splice chamber which is open in upward direction. When the slide arrives in the upper end position the second splice chamber is pressed against a counter-plate which is fixed to the frame and not moved with the slide so that the splice chamber is closed in upward direction. In the upper end position of the slide the first continuously supplied yarn thread and the second still resting yarn thread extend parallel to each other with a small distance from each other in the second splice chamber. The second yarn thread is then released by releasing the clamping device and the second splicing chamber is pneumatically biased which causes a swirl and a splicing of the two yarn threads to each other. After the establishment of the splicing the first yarn thread is able to take the second yarn thread along. With the initiation of the movement of the second yarn thread also the free end section of the second yarn thread which is not spliced enters with the first yarn thread into the first splicing chamber. Accordingly, also this end section of the second yarn thread is swirled with the first yarn thread.

DE 2 119 410 A1 (corresponding to U.S. Pat. No. 3,672, 148 A) discloses a connection of ends of glass fiber multifilaments by stitching the overlapping ends in an encircling way with an elastic thread which presses the two ends against each other so that the two ends are connected to each other by a frictional connection.

JP S 60-61452 A discloses the connection of two ends of tapes by a positive form-lock. A rectangular through recess is generated in a first end of a first thread. A groove-like recess is provided at the second end of the second tape such that the cross-section of the second end remaining at the recess corresponds to the cross-section of the rectangular through recess of the first end. For providing the positive connection the second end is passed through the through recess of the first end in a way such that the second end is accommodated by a positive form lock in the through recess of the first end at its recess. The publication discloses pliers that can be used for establishing the connection.

It is also known to connect ends of tapes to each other by an additional adhesive strip. According to EP 0 001 465 A1 an adhesive strip covers end sections of tapes abutting with the front faces for connecting the same.

U.S. Pat. No. 5,064,488 A discloses a method and a device for connecting an end section of a first film material of a wound package to the start section of a corresponding film material of another wound package, the film material being supplied to a processing station as a labeling machine after providing the connection. The connection of the end section to the start section is provided by splicing. Here, a splicing strip coated with an adhesive substance is manually applied to the start section. Subsequently the actual splicing process is executed. It is also possible that an adhesive is painted or sprayed onto an outer surface of the film material.

U.S. Pat. No. 3,089,661 A discloses the connection of webs of a cigarette paper. An end section of a leaving web is connected to a start section of a new web by means of compressing the webs and generating a pressure splicing without the use of any adhesive but with a welding of the webs due to the compression at a plurality of small contact areas between the webs.

Further prior art is known from US 2010/0186879 A1 and U.S. Pat. No. 3,607,507 A.

SUMMARY OF THE INVENTION

The proposed method for connecting an end section of a first tape to a start section of a second tape for producing a tape string is in particular improved with respect to
- an automization and/or
- an interaction with the processing process of the tape string and/or
- a reduction of a contamination of the processing process with undesired admixtures and/or
- an extension of the options of use also for tapes which are not embodied as yarn thread string or multifilament and/or
- a conservative treatment of the tapes and/or
- a simplification of the change from a provision of a first tape from a first wound package to the provision of a second tape from a second wound package and/or
- an improvement of the process security.

Furthermore, a correspondingly improved tape connecting device and a processing device with a tape connecting device of this type are proposed.

The invention relates to a method wherein an end section of a first (in particular elongate) tape can be connected to a start section of a second (in particular elongate) tape. In this way a tape string is provided which comprises at least the first tape and the second tape and which has a length corresponding to the sum of the length of the first tape and the second tape (reduced by the length of the connecting section of the same or reduced by the sum of the start section of the second tape and the end section of the first tape). Here, an elongate tape in particular denotes a tape having a length of at least the 1.000-fold, 10.000-fold, 100.000-fold or 1.000.000-fold of the largest transverse extension of the tape and/or having a length of at least 100 m, 1 km or 10 km.

The tape processed in particular is
- a security tape (e. g. comprising a hologram) for a security document as a banknote and/or
- a tape made of PES or PE (uncoated or aluminized) and/or
- a tape having a width which is 16 to 120 (or 30 to 100) times larger than the thickness (e. g. a tape having a width in the range of 1 mm to 12 mm and a thickness of 10 μm to 60 μm) and/or
- no yarn thread bundle or multifilament, but a one-pieced tape and/or
- a tape made of plastic or a coated tape of plastic and/or
- a tape having a closed cross-section that might have a flattening and/or might be rectangular cross-section (in some cases with rounded edges).

In the method the tape string can be supplied to a processing process wherein the tape string is used for manufacturing an end product which comprises at least one further component and/or wherein the tape string is further processed. For the example of the embodiment of the tape as a security tape for a security document as a banknote the tape string is supplied to a processing process wherein the security tape is embedded into the base material of the banknote (in particular into a aqueous suspension of mash or slurry of the paper or cotton paper of the banknote).

A connection of the end section of the first tape to the start section of the second tape is provided by a liquid arranged between the same. In the connecting section the liquid connects the end section of the first tape and the start section of the second tape by an adhesion so that a tape string comprising the first tape and the second tape is formed.

So, there is no splicing of filament yarn tapes and no connection by an adhesive strip or a common adhesive as being the case according to the prior art. Instead, a liquid is used which fulfills one of the following specifications, any of two of the following specifications or all of the following specifications:
- the liquid is a non-hardening liquid and/or
- the liquid corresponds to a liquid used in the subsequent processing process and/or
- the liquid is water (it is e. g. possible that distilled water or water taken from a common public line system is used).

Additionally, the liquid might fulfill one, a plurality or all of the following specifications:
- the liquid is a liquid which is volatile without any residuals and/or
- the liquid does not establish any chemical binding to the surfaces and the material of the tapes and/or
- the liquid is a non-drying liquid and/or
- the liquid is a pure liquid with only one single chemical component and/or
- the liquid does not comprise any additives or components for influencing or adjusting the adhesive effect and/or
- the liquid is not an 'adhesive' in the classical sense and/or
- the liquid has a viscosity being smaller than 10 m PA s or smaller than 5 m PA s or smaller than 2 m PA s and larger than 0.1 m PA s or larger than 0.5 m PA s and/or
- the liquid connects to the tapes by a dipole-effect and/or the liquid attaches by the surface tension to the tapes and/or the liquid comprises a small interfacial surface tension with the tapes wherein a contact angle Theta or the wetting angle (which denotes the angle which a drop of the liquid forms on the surface of a solid material relative to the surface) is smaller than 15° or smaller than 10° or smaller than 5°.

Preferably, here a connection is provided without the use of any splicing process or any other method additional to the connection provided by the liquid.

If the tape is a security tape for manufacturing a banknote the liquid might be water, water also being used as a liquid in the slurry of the paper or cotton paper.

It is possible that the present invention overcomes the prejudice of the skilled person that for establishing a connection of the first tape to the second tape an additional connecting element as an elastic thread for stitching and encircling the overlapping ends according to DE 21 19 410 A1, a connection of the tapes with a positive form-lock according to JP S60-61452 A, an additional adhesive strip according to EP 0 001 465 A1 or a splicing of a plurality of filaments of a yarn according to DE 35 40 324 A1, EP 1 209 115 A2, DE 33 36 202 A1 is required. Instead, the invention has surprisingly discovered that a connection of the two tapes can be provided by a liquid by means of an adhesion. This simplifies the establishment of the connection because there is no stitching and encircling and no use of an additional element as an adhesive strip is required. Furthermore, according to the invention an undesired interaction of a classical adhesive with the processing process and the introduction of undesired components into the processing process connected therewith can be avoided.

It is possible that the tape string is continuously supplied to the processing process after the establishment of the connection and after the generation of the resulting tape string. Here, a 'continuous' supply is in particular understood to cover a supply without any stop, so with a constant or changing velocity being larger than zero, as well as clocked or synchronized supply wherein after a respective stop a feeding movement is provided after a predefined clock time or the feeding is provided in an intermittent way with a regular pattern.

Accordingly, it is possible that the supply and feeding movement does not change during the change from the first tape to the second tape (except the fact that in the connecting section of the two tapes the overlapping two tapes are supplied to the processing process).

For one proposal in the method the first tape is conveyed with a distance from the start section of the second tape. Here, preferably the second tape is not moved or not conveyed in its longitudinal direction. A wetting of the above-mentioned liquid is applied to the end section of the first tape. Alternatively or cumulatively, the wetting of the liquid can be applied to the start section of the second tape. By a joining device the start section of the second tape and/or the end section of the first section are/is moved in a way such that the distance of the same reduces. Here, the invention covers both embodiments wherein the joining device actively moves one tape as well as embodiments wherein the joining device only releases the tape so that the tape is able to move and e. g. falls down due to its own weight towards the other tape. The start section of the second tape and the end section of the first tape contact each other in a connecting section which might also be the case under the generation of a pressing force. Due to the wetting with the liquid and the resulting arrangement of the liquid in the connecting section between the first tape and the second tape an adhesive connection is established between the tapes. With or after the generation of the adhesive connection then a common movement of the first tape and of the second tape to the processing process takes place.

Due to the fact that (as explained above) it is possible that during the generation of the connection the first tape is moved with its conveying velocity whereas the second tape initially (disregarding its movement for coming closer to the first tape) is not objected by any conveying movement, for the common movement of the first tape and of the second tape to the processing process the second tape has to be accelerated to the conveying velocity of the first tape. Here, it is possible that the connection provided by the adhesion is already sufficient for providing a force for accelerating the second tape so that the second tape 'takes along' the first tape (which in some cases might also be provided with a continuously reducing slip in the connecting section connected by the adhesion). However, it is also possible that the adhesive connection by the liquid only provides a part of the required force for accelerating the second tape wherein this part might e. g. be smaller than 50%, smaller than 40%, smaller than 30%, smaller than 20% or even smaller than 10% of the overall effective force for accelerating the second tape.

For a particular proposal the force for accelerating the second tape for generating the common movement of the first tape and the second tape is partially caused by a drive (so not only by the force generated in the region of the adhesive connection). It is e. g. possible that a conveyer roll is driven by a separate drive, the separate drive starting its movement prior to or with the pressing of the second tape to the first tape by the joining device. A drive of this type might be arranged in the working region of the joining device or in front of the same or behind the same and might e. g. drive the tape (which is at least partially wrapped around the conveyer roll) by friction.

For a particular embodiment of this idea the start section of the second tape contacts a first conveyer roll. If then the start section of the second tape is moved by the joining device in a way such that the distance of the two tapes reduces until the tapes contact each other, a movement of the first conveyer roll (which might be a component of the joining device) towards the first tape (which is preferably continuously conveyed) is generated. At the end of this movement the first conveyer roll interacts with a second conveyer roll. Preferably, the outer surface of the first conveyer roll establishes a friction contact with the outer surface of the second conveyer roll. Here, the second conveyer roll rotates corresponding to the movement of the continuously conveyed first tape. Here, the second conveyer roll might be embodied as a conveyer roll driven by a motor, the conveyer roll causing or supporting the continuous conveying movement of the first tape. However, it is also possible that the first tape is wrapped around the second conveyer roll and that due to the conveying movement of the first tape the tape causes the rotation of the second conveyer roll. Due to the interaction between the two conveyer rolls a force for an acceleration is applied on the first conveyer roll which (due to the fact that the second tape is wrapped around the first conveyer roll) leads to a driving force. By this driving force the start section of the second tape is accelerated for causing a common movement of the end section of the first tape and of the start section of the second tape after the establishment of the adhesive connection. Accordingly, in this case on the one hand the two tapes are connected by the adhesive connection which might provide a part of the accelerating force or might only serve for holding the two tapes together. At least a part of the force for accelerating the second tape is accordingly taken from the conveying movement of the first tape or from an associated conveying roll.

Another embodiment of the method considers that it is required to guide the first tape with respect to its position, the conveying direction and the orientation of the tape about its longitudinal axis by at least one guiding device having a fixed location. Possible guiding devices having a fixed location might be two sliding rods or guiding rolls. The two sliding rods or guiding rolls might extend parallel to each other. Here, it is possible that a gap or slit is established between the sliding rods or guiding rolls. The first tape passes through the gap or slit. In this way it is possible that for a vertical orientation of the sliding rods or guiding rolls a horizontal guidance is provided. However, it is also possible that the first tape is deflected in opposite directions on the outer surfaces of the sliding rods or guiding rolls. Alternatively or cumulatively it is possible that as a guiding device a deflecting roll is used by which the orientation of the cross-section of the first tape about its longitudinal axis can be changed. It is alternatively or cumulatively possible that at least one deflecting roll is used as a fixed guiding device. By the deflecting roll it is possible to change the conveying direction of the first tape corresponding to the wrapping angle of the deflecting roll. Finally, it is also possible that the guiding device is an outlet guide which defines the location and the orientation where and with which the tape string leaves the used tape connecting device. Furthermore it is possible that a joining guide is used wherein at the same time the first tape as well as the second tape (in some cases even before their connection) are guided and which guides the movement of the two tapes towards each other due to the change of the joining device from the inactive operating state into the active operating state. The joining guide might e. g. be a plate comprising a slit wherein the two tapes are arranged and guided one above the other and wherein the two tapes are guided in lateral direction in a way such that the tapes are positioned one above the other when transferring the joining device into the active operating state. The aforementioned guiding devices might comprise an adjusting device by which it is possible to adjust the position and orientation.

It is possible that the components required for executing the method are exclusively manually actuated. However, the method can also be automized (partially or completely). Here, one embodiment proposes that in the method an electronic control unit is used. By means of the electronic control unit (and an associated control logic) the related components can be controlled. Here, a control covers both an open loop control and a closed loop control. Here, by means of the control by the control unit a holding device can be actuated by which one end of the second tape can be held and fixed. Alternatively or cumulatively it is possible that the control of the control unit actuates a wetting device by which the first tape and/or the second tape are/is wet by the liquid. Alternatively of cumulatively it is possible that the control of the control unit controls the joining device. Finally, it is also possible that the control unit controls a cutting device. Here, any control philosophy can be used.

For one proposal in an operating state which is a state without an energetic bias by the control unit the holding device and/or the clamping device are/is in a state holding or clamping the second tape (in particular due to the effect of a spring) whereas a release of the holding device or clamping device is provided by an energetic bias of the same by the control unit (in particular against the effect of the aforementioned spring).

Any directly or indirectly electronically controlled actuator might be used as the actuator which is controlled by the control unit. Accordingly, it is e. g. possible that an electric motor or step motor is used. For a particular proposal the control unit controls a valve of a pneumatic actuator (in particular a pneumatic cylinder). The pneumatic actuator then actuates the holding device, the clamping device, the wetting device, the joining device or the cutting device. It is possible that a plurality of pneumatic actuators is used for the aforementioned devices. However, it is also possible that one pneumatic actuator is used in a multifunctional way wherein the pneumatic actuator both actuates the clamping device and the cutting device. Here, it is e. g. possible that in a first stroke part of the pneumatic actuator the clamping device is transferred from the clamping state into a released state releasing the second tape wherein the second tape can be moved in its longitudinal direction, but at the same time the second tape is guided transverse to the longitudinal direction by the clamping device with a distance from the first tape. In a second stroke part of the pneumatic actuator the cutting device is actuated for cutting the first tape. In the second stroke part shortly before the cutting, simultaneously with the cutting or shortly after the cutting the clamping device is again opened in a way such that the second tape is able to move towards the first tape. It is alternatively or cumulatively possible that a valve is used in a multifunctional way by using the valve e. g. both for transferring the joining device into the active operating state as well as for transferring the clamping device into the non-clamping operating state.

The options for operation can be extended for one embodiment of the invention by providing that it is possible to both actuate the holding device and/or clamping device electronically by the control unit as well as manually. Here, the manual actuation might e. g. be used for gripping or holding one end of the second tape provided from the wound package by the holding device and then connecting the holding device to the tape connecting device. Here, the holding device is manually actuated. Preferably, the holding device fixes the end of the second tape by a spring so that the insertion of the end of the second tape into the holding device requires the manual actuation against the spring. However, the end of the second tape is held and fixed in the holding device without the need of applying forces manually. In a corresponding way the second tape can be inserted with a manual actuation of the clamping device into a non-clamping operating state whereas then the spring closes the clamping device so that without a manual application of forces the second tape is clamped in the clamping device.

In a method the following method steps can be executed:
a) One end of the second tape is held by a holding device. The second tape is inserted into a clamping device and the second tape is clamped by the clamping device. The second tape is also inserted into a working region of a joining device which is located between the holding device and the clamping device. The order of the aforementioned method steps is arbitrary. In particular in the case that the second tape is held under tension by the unwinding device (e. g. so-called bitensors which allow a limited winding) the preferred order is: inserting into the holding device, inserting into the joining device and inserting into the clamping device.

b) Subsequently, a wetting device is actuated. Due to this actuation the wetting of the liquid is applied to the end section of the first tape and/or to the start section of the second tape.

c) Subsequently, the joining device is actuated. This actuation leads to the result that the start section of the second tape is moved in a way such that the distance of the start section of the second tape from the conveyed first tape is reduced such that these contact each other and the adhesive connection between the start section of the second tape and the end section of the first tape is established due to the wetting in the connecting section.

Here, additional method steps can be executed before, during and/or after the aforementioned method steps. Accordingly, preferably the second tape 6 is released by the holding device 15, the second tape 6 is released by the clamping device 13 and the second path 5 is joined with the conveying path 3.

During the method steps a), b) and c) there is a continuous conveying movement of the first tape whereas (except the movement for reducing the distance between the two tapes) the second tape rests. With or after the method step c) then there is a common movement of the first tape and of the second tape to the processing process.

The method can only be used for one single tape string. However, it is also possible that in at least one processing device a plurality of tape strings are processed simultaneously or in parallel. Here, the tape strings run through the at least one processing device along parallel processing paths. If in this case the connections between the tapes of the respective tape strings are established in a not coordinated (and in some cases manual) way the connecting sections of the two tapes in the respective tape strings run through the at least one processing device with an offset in time. If products manufactured in the processing device are not allowed to contain the connecting section of the tapes because these do not fulfill the quality requirements it is required to sort out these products as deficient products. If the connection is provided in a not coordinated way and in some cases manually it is required to sort out all of the products for which at the same time in one of the tape strings the connecting section has been processed so that also products from other tape strings have to be sorted out wherein no connecting section of the other tape string is present or the effort for sorting out has to be increased. It is possible that the method considers this problem in that in the method in parallel or simultaneously a plurality of couples of first and second tapes are each connected to each other for building a tape string which are then in parallel or simultaneously supplied to the same processing device or different processing devices. A control unit can be used by which an actuation of the devices required for the respective establishment of the connections is controlled and in particular synchronized. The synchronization might e. g. be provided in a way such that connecting sections generated in the single tape strings are simultaneously supplied to the at least one processing device so that products manufactured at the same point in time containing the connecting sections can be sorted out for all of the processing strings or pathes so that the effort for sorting out and in some cases also the number of defective goods can be reduced.

The invention also proposes a tape connecting device by which a method as explained above is executed. A first conveying path for a first tape is provided in the tape connecting device which in particular passes the aforementioned guiding devices. The first tape is conveyed along the first conveying path. Furthermore, a second path is defined for a second tape (also passing along the above described components). The second tape extends (initially resting) along the second path. The tape connecting device furthermore comprises a wetting device. By means of the wetting device it is possible to wet the first tape and/or the second tape in a connecting section with a liquid. The tape connecting device also comprises a joining device. By means of the joining device it is possible to adapt the first conveying path and/or the second path. The joining device here comprises an inactive operating state and an active operating state:

In the inactive operating state the first conveying path for the first tape and the second path for the second tape are arranged with a distance from each other in a working region of the joining device.

Instead, in the active operating state the first conveying path for the first tape and the second path for the second tape are joined with each other in the working region of the joining device so that a start section of the second tape and an end section of the first tape contact each other in the connecting section. In this way an adhesive connection between the start section of the second tape and the end section of the first tape is established due to the wetting of the connecting section with the liquid.

The tape connecting device might comprise a holding device, a clamping device and/or a cutting device.

Preferably, a control unit is present, which comprises control logic by which it is possible to actuate the holding device, the clamping device, the wetting device, the joining device and/or the cutting device.

It is also possible that the tape connecting device comprises a pneumatic actuator for the holding device, the clamping device, the wetting device, the joining device or the cutting device.

It is possible that in the tape connecting device the holding device and/or the clamping device can be actuated both electronically via the control unit as well as manually.

If a control unit is mentioned, only one single local control unit might be provided. However, it is also possible that there are a number of sub-control units communicating with each other or forming a network.

The invention also proposes a processing system for processing a plurality of tape strings. The tape strings each comprise a pair of first and second tapes. The pairs of first and second tapes are each connected to each other in a connecting section by adhesion of a liquid in an end section of the first tape and a start section of the second tape (as described above). In the processing system at least one electronic control unit is provided. The electronic control unit comprises control logic by which it is possible to control an actuation of the devices required for establishing the respective connections in the connecting sections. Preferably, the control is provided in a synchronized fashion. By the synchronization it is e. g. possible to provide (as explained above) that the connecting sections are supplied at one and the same time to the processing process in the processing system.

The invention also proposes a use
of a method as explained above,
of a tape connecting device as explained above or
of a processing system as explained above
for a first tape and second tape being embodied as a security tape for a security document.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb 'at least'. For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
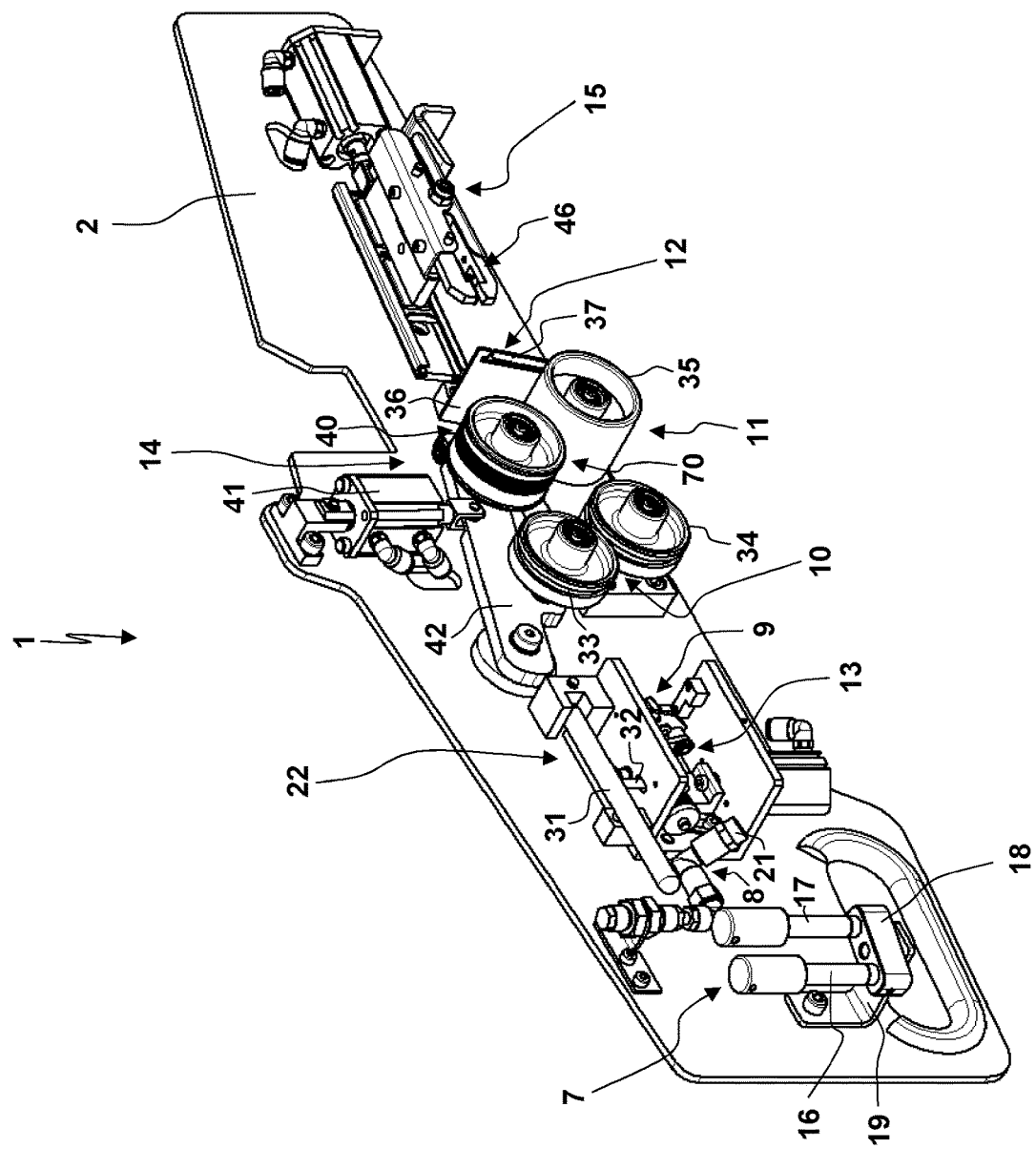
FIG. 1 in a three-dimensional view shows a tape connecting device.

FIG. 1 shows a tape connecting device 1 in a three-dimensional view. The tape connecting device 1 comprises a (here plate-like) supporting structure 2. The supporting structure 2 is arranged between a delivery station for tapes and a processing device where the tape string is processed for manufacturing a product (here not shown). The supporting structure 2 is arranged at a fixed location or can be moved. It is e. g. possible that for easing the insertion of the tapes the supporting structure 2 can be pivoted in downward direction or to the front by the handle visible e. g. in FIG. 1 via a mechanism which is not shown. In the normal operating state not pivoted in downward direction it is e. g. possible that the supporting structure 2 is arranged above the height of the head. The delivery device might be a first bobbin for providing a first tape and a second bobbin for providing the second tape (in some cases with a plurality of further bobbins with additional tapes). However, it is also possible that the delivery station is a manufacturing device which manufactures both a first tape and a second tape. Furthermore, it is possible that by means of the tape connecting device 1 a change between two different tape types (e. g. with different holograms) is possible. The processing device might e. g. be a manufacturing device for a security document as a banknote wherein the tape string formed by the tapes is a security tape which is embedded into the base material of the banknote.

The tape connecting device 1 comprises a conveying path 3 for a first tape 4. The first tape 4 is continuously conveyed along the conveying path 3 which might be the case with a constant conveying velocity, a changing conveying velocity being larger than 0 or with an intermittent conveying velocity with a regular pattern. Furthermore, the tape connecting device 1 comprises a path 5 for a second tape 6. In the beginning, before the connection of the tapes 4, 6 there is no conveying movement of the second tape 6. However, there is an approaching or joining movement of the path 5 towards the conveying path 3.

The tape connecting device 1 comprises a guiding device 7, a wetting device 8, a cutting device 9, a guiding device 10, a guiding device 11 and a guiding device 12 which in this order interact in the conveying direction of the first tape 4 in the conveying path 3 with the first tape 4.

The tape connecting device 1 comprises the guiding device 7, a clamping device 13, a joining device 14, the guiding device 12 and a holding device 15 which are arranged in this order along the path 5 of the second tape 6.

The guiding device 7 arranged at the inlet of the tape connecting device 1 consists of two cylindrical guiding rolls 16, 17. The guiding rolls 16, 17 have a step-shaped extension at the free end regions and have a rotational axis having an orientation in vertical direction. The outer surfaces of the guiding rolls 16, 17 with the smaller diameters interact with the tapes 4, 6 so that the longitudinal extension of this sub-portion of the guiding rolls 16, 17 is dimensioned in a way such that this portion extends into the conveying path 3 and into the path 5. The guiding rolls 16, 17 are supported for being rotated on a support 18. The support 18 is again held by a supporting element 19 (here embodied as an L-shaped metal sheet) on the supporting structure 2. Here, it is possible to adjust the guiding device 7 by a rotation of the support 18 relative to the supporting element 19 about an adjusting axis having an orientation parallel to the rotational axis of the guiding rolls 16, 17. When viewing in conveying direction of the first tape 4 the guiding rolls 16, 17 form a vertical slit. The width of the slit can be adjusted by means of the aforementioned adjustments. The guiding device 7 serves for guiding the tape 4 in a horizontal plane and transverse to the conveying direction of the same.

The wetting device 8 comprises a port by which the liquid which is to be applied as the wetting 20 on the first tape 4 is supplied to the wetting device 8. Furthermore, the wetting device 8 comprises a nozzle 21 on the outlet side by which the characteristic for outputting the liquid out of the wetting device 8 can be defined. Furthermore, the wetting device 8 comprises an electronically controlled valve 86 and an electronic control port for controlling the valve 86 by an electronic control unit 59. By means of the valve 86 it is possible to activate the wetting device 8 for connecting the tapes 4, 6 and to deactivate the wetting device 8 when no connection of tapes 4, 6 takes place.

Figure 2:
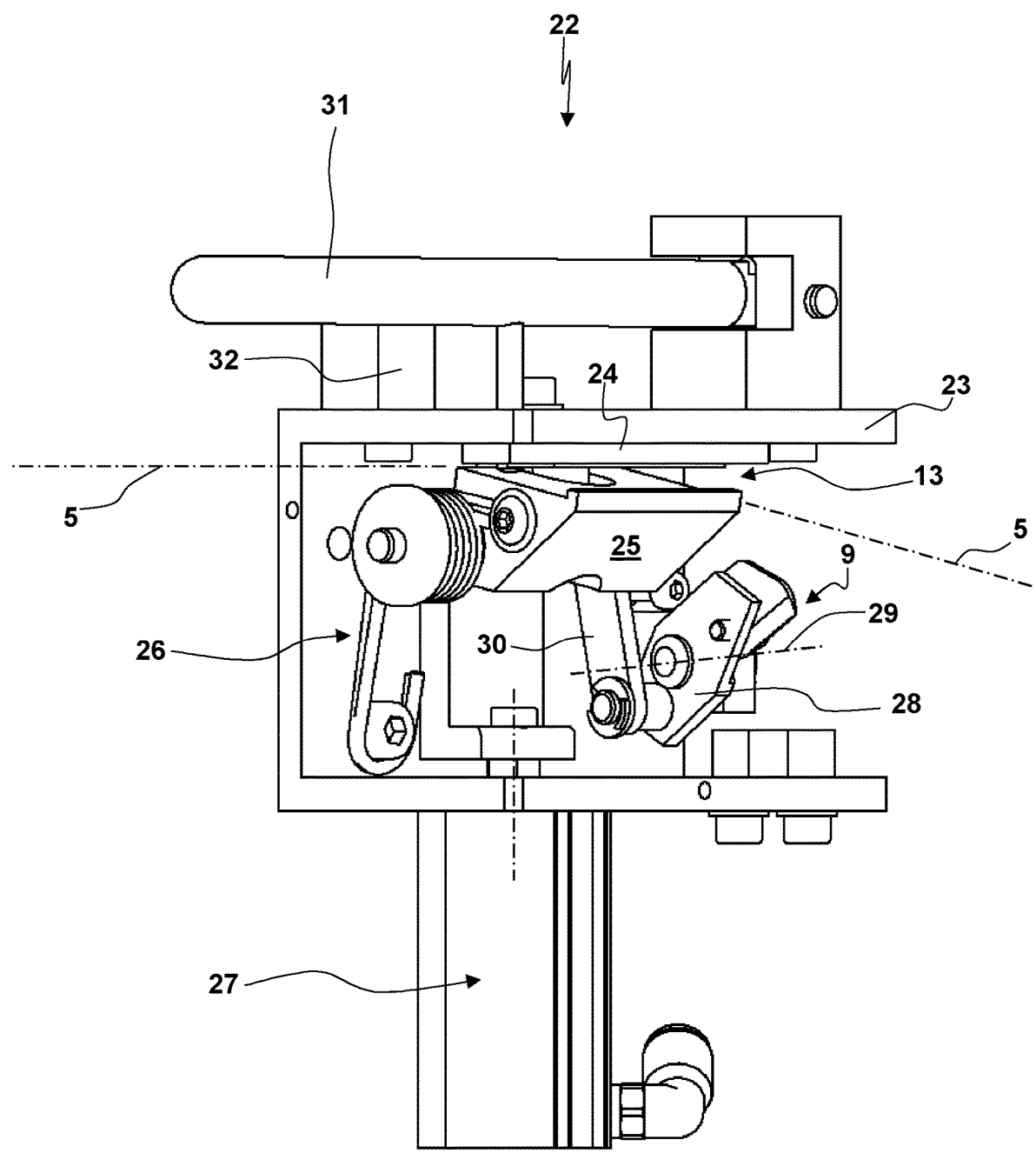
FIG. 2 in a three-dimensional view shows a clamping and cutting device of a tape connecting device of FIG. 1.

For the shown embodiment of the tape connecting device 1 the cutting device 9 and the clamping device 13 form a combined clamping and cutting device 22 which is shown in FIG. 2. The clamping and cutting device 22 is held by a supporting element 23 (which is here U-shaped) on the supporting structure 2. The clamping device 13 comprises a clamping plate 24 fixed on the supporting element 23 and a clamping jaw 25 supported for being pivoted on the supporting element 23. By a spring 26 (here a torsional leg spring) the clamping jaw 25 is biased towards the clamping plate 24 into a clamping state wherein the second tape 6 inserted between the clamping plate 24 and the clamping jaw 25 is clamped in the path 5 and so held and fixed. By a pneumatic actuator 27 and a stem or any other transmission connection which connects the pneumatic actuator 27 to the pivoting clamping jaw 25 it is possible to generate an opening force biasing the clamping jaw 25. By means of the opening force it is possible to transfer the clamping jaw 25 against the force of the spring 26 into the open state being effective in FIG. 2 wherein the second tape 6 clamped in the clamped state is released. Without the pneumatic bias of the pneumatic actuator 27 the clamping device 13 is in the clamping state whereas the pneumatic bias of the pneumatic actuator 27 is required for inducing the open state of the clamping device 13 of FIG. 2. Also the pneumatic actuator 27 is controlled via an electronically controlled valve 87 by an electronic control unit 59.

The pneumatic actuator 27 of the clamping and cutting device 22 is also coupled by a stem or a transmission connection to the cutting device 9 for actuating the cutting device 9. Here, it is also possible that the same transmission connection or coupling rod is used as the transmission connection or coupling rod used for coupling the pneumatic actuator 27 to the clamping device 13. The cutting device 9 comprises a cutting knife 28 which is supported for being rotated about a pivot axis 29 on the supporting element 23. The cutting knife 28 forms a lever with two lever parts wherein one lever part comprises a cutting edge and the other lever part is linked to the transmission connection or coupling rod 30 by which the cutting knife 28 is coupled to the pneumatic actuator 27.

The pneumatic actuator 27 is designed and controlled such that the pneumatic actuator 27 comprises a first stroke part and a second stroke part. In the first stroke part the clamping jaw 25 is opened from the clamping state into the open state of FIG. 2. In this open state it is possible to move the second tape 6 in its longitudinal direction. On the other hand, in the open state the second tape 6 is guided in vertical direction between the clamping jaw 25 and the clamping plate 24 so that in the open state the distance between the first tape 4 and the second tape 6 is upheld in the region of the clamping device 13. The cutting knife 28 is also pivoted in the first stroke part. However, the cutting knife 28 does not arrive in a cutting state. Accordingly, the first stroke part is exclusively used for releasing the second tape 6 clamped by the clamping device whereas still a guidance in vertical direction is provided. Instead, in the second stroke part the clamping jaw 25 is further opened such that the lower guidance of the second tape 6 is no longer present and the second tape 6 is able to move in downward direction until the second tape 6 extends along the conveying path 5. Due to the fact that at the same time the cutting device 9 cuts the first tape 4, the process can then be continued with the second tape 6.

In the second stroke part the cutting knife 28 is transferred into the closed state or cutting state wherein the cutting knife 28 interacts with the first tape 4. Here, it is possible that in the cutting state a cutting edge of the cutting knife 28 is pressed against a counter-face held on the supporting element 23.

Accordingly, the pneumatic actuator 27 is used in a multifunctional way, i. e. for actuating both the cutting device as well as the clamping device 13.

Additional to the actuation of the clamping and cutting device 22 by the pneumatic actuator 27 based on the electronic control by an electronic control unit 29 the clamping and cutting device 22 can also be actuated manually: A manipulation lever 31 is supported for being pivoted on the supporting element 23. The manipulation lever 31 is coupled by a coupling rod or a transmission connection 32 to the clamping jaw 25 (and to the cutting knife 28). If (in particular for allowing to insert the second tape 6) the manipulation lever 31 is pressed manually in downward direction, an actuation force applied to the manipulation lever 31 and transmitted by the coupling rod or transmission connection 32 is able to transfer the clamping jaw 25 into the open state of FIG. 2. For that purpose the manual actuation force has to overcome the closing force of the spring 26.

The guiding device 10 is a guiding roll 34 on which the lower side of the first tape 4 rolls off and which guarantees the required orientation of the cross-section of the first tape 4. The guiding roll 34 in particular guarantees that a flattening of the first tape 4 has an orientation in downward direction so that it is possible that the wetting device 8 applies the wetting 20 to the flattening and (as explained also in the following) it is possible that the second tape 6 is positioned from above on the flattening of the first tape 4 for the generation of the desired adhesive connection in the region of the flattening. In the case that the tapes 4, 6 are tapes having a rectangular cross-section, the guiding roll 34 might e. g. provide that a longer side of the rectangular cross-section of the first tape 4 has a horizontal orientation. Here, it is also possible that a corresponding orientation of the cross-section of the second tape 6 is provided.

The guiding device 11 is embodied as deflecting roll 35. The first tape 4 contacts the deflection roll 35 with a circumferential warp angle (for the shown embodiment in the region of e. g. 20° to 60°). In dependence on the circumferential wrap angle it is possible to change a conveying direction and the extension of the first tape 4 with which the first tape 4 leaves the tape connecting device and with which the first tape 4 is supplied to the processing device.

Optionally, the further guiding device 12 can be arranged downstream from the guiding device 11. For the shown embodiment the further guiding device 12 is embodied as a plate 36 comprising a vertical slit 37. The first tape 4 extends through the slit 37 for providing a horizontal guidance. Furthermore, it is possible that the guiding device 12 comprises two guiding rolls being spaced apart. The guiding rolls have an orientation transverse to the slit 37 and define a maximum upper position and a maximum lower position of the first tape (and of the second tape 6, see below) in the slit 37.

The joining device 14 comprises a joining roll 40 and a guiding roll 33. The guiding rolls 33,34 provide that the tapes 4,6 have a horizontal orientation and are guided with a small vertical distance from each other one above the other. The guiding roll 33 and the joining roll 40 are moveable by an actuator 41 (here an pneumatic actuator 41, electronically controlled via a valve 88 by the control unit 59) in a way such that the path 5 of the second tape 6 joins with the conveying path 3 of the first tape 4 and a contact force between the first tape 4 and the second tape 6 can be induced. For the shown embodiment the guiding roll 33 and the joining roll 40 are supported on a pivot lever 42. The pivot lever 42 is again supported for being pivoted on the supporting structure 2. The pneumatic actuator 41 is linked by a coupling rod or transmission connection to the pivot lever 42 at a location remote from its pivot axis so that by an actuation of the pneumatic actuator 41 it is possible to induce a pivoting movement of the pivot lever 42. Preferably, without a pneumatic bias of the pneumatic actuator 41 the pivot lever 42 is in its start position. The start position is also denoted as the inactive operating state. In the start position the path 5 of the second tape 6 has a distance from the conveying path 3 of the first tape 4. With a pneumatic actuation of the pneumatic actuator 41 the joining state of the pivot lever 42 and of the joining roll 40 is achieved which is also denoted as the active operating state. In the joining state the tapes 4, 6 contact each other and in some cases the tapes 4, 6 are pressed against each other.

Figure 3:
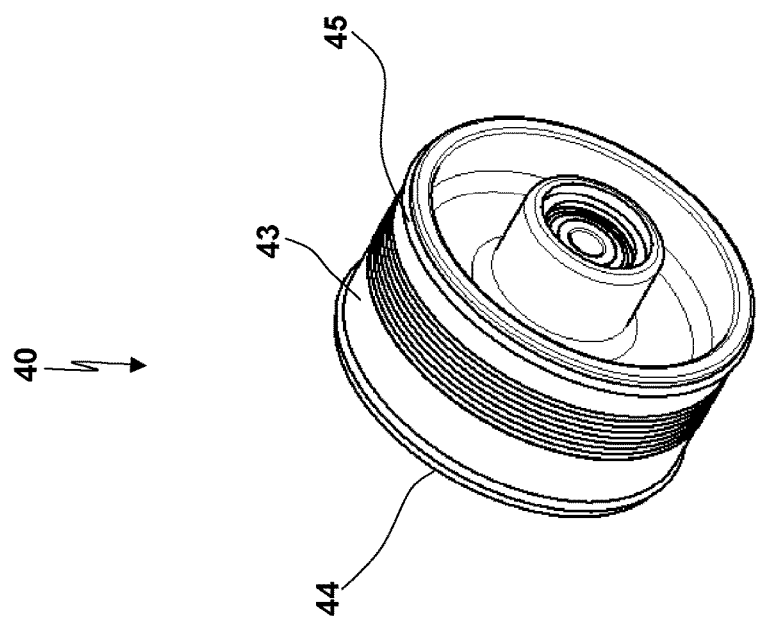
FIG. 3 in a three-dimensional view shows a conveyer roll of a joining device of a tape connecting device of FIG. 1.

FIG. 3 shows a possible embodiment of a joining roll 40 in a three-dimensional view. The joining roll 40 comprises a generally cylindrical tape guiding surface 43 which is limited at the axial ends by a step with a widening of the cross-section which forms friction rings 44, 45. It is possible that the tape guiding surface 43 comprises a coating, surface wrinkling and the like in order to adjust the contact conditions between the joining roll 40 and the tapes 4, 6. It is possible that the joining roll 40, parts of the joining roll 40 or only the friction rings 44, 45 are resilient.

Figure 4:
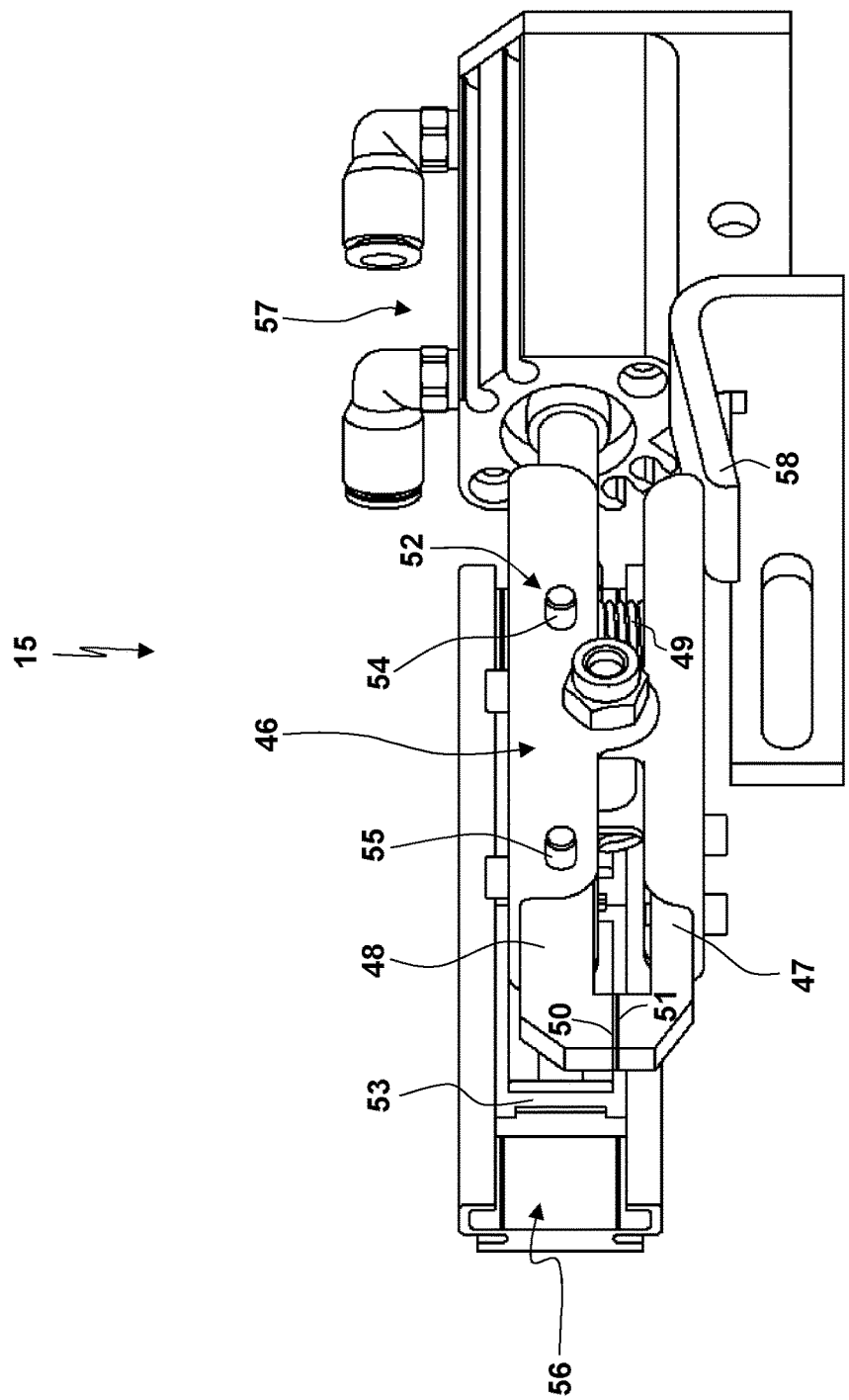
FIG. 4 in a three-dimensional view shows a holding device of a tape connecting device of FIG. 1.

FIG. 4 shows a possible embodiment of a holding device 15 in a three-dimensional view. The holding device 15 comprises a clamping device 46 by which it is possible to clamp the front free end of the second tape 6. For the shown embodiment the clamping device 46 comprises two clamping jaws 47, 48. The clamping jaws 47, 48 are biased by a clamping spring 49 into the clamping or closed state wherein clamping surfaces 50, 51 arranged in the end region of the clamping jaws 47, 48 clamp the front free end of the second tape 6.

It is possible to append or fix the clamping device 46 by a releasable connection 52 to a slide 53. The releasable connection 52 might e. g. be embodied as any connector assembly, latching, resting or blocking connection. For the shown embodiment the releasable connection comprises pins 54, 55 that can be pinned or inserted in horizontal direction into the slide 53. The slide 53 is guided for being displaced by a linear guide 56 comprising a translational degree of freedom. Preferably, the translational degree of freedom has an orientation exactly or approximately corresponding to the direction of the conveying path 3 or the path 5 or parallel to the same.

It is possible that the slide 53 with the clamping device 46 held on the slide can be moved by the pneumatic actuator 57 shown here. With this movement of the slide 53 in a way controlled by motion a lever part of the clamping jaw 47 (which is not the lever part comprising the clamping surface 51) contacts an actuation surface 58. With a further movement the end portion of the clamping jaw 47 slides along the actuation surface 58. Due to the fact that the actuation surface 58 is inclined relative to the translational moving direction the movement leads to a pivoting movement of the clamping jaw 47. With the pivoting movement of the clamping jaw 47 the clamping surfaces 50, 51 move away from each other. The clamping jaws 47, 48 are opened against the bias of the clamping spring 49 so that the end of the second tape 6 is released. For the shown embodiment the slide 53 with the clamping device 46 is moved along the linear guide 56 with a simultaneous control by motion by the resting actuation surface 58. However, it is also possible that the clamping device 46 is not moved for inducing the opening movement, but held at a fixed location on the linear guide 56 or that there is no linear guide at all, whereas in this case the actuation surface 58 is moved by the pneumatic actuator 57. Also here the pneumatic actuator 57 is controlled by an electronic control unit 59 via a suitable electronically controlled valve 89. An advantage of the shown linear movement is that the clamping jaw 51 is moved away from the second tape 6 in a horizontal direction. Accordingly, it is not possible that the second tape 6 rests on the clamping jaw 51—instead the second tape 6 falls down in a reliable way.

Figure 5:
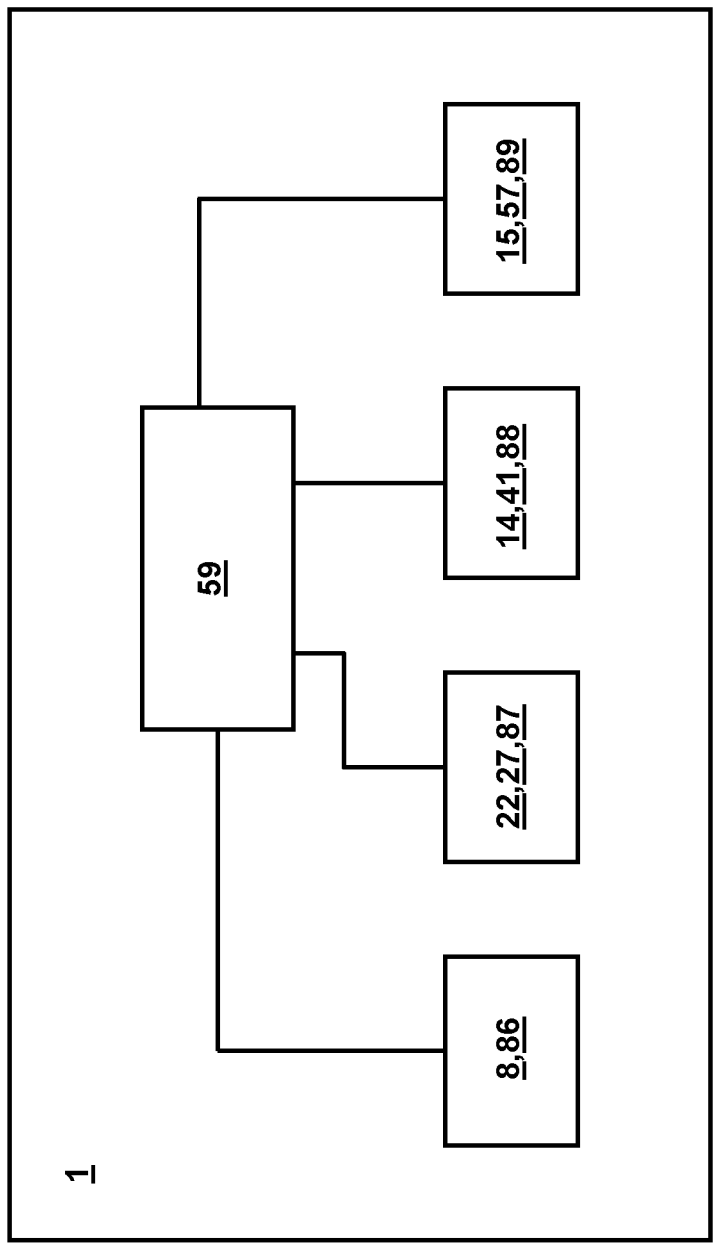
FIG. 5 schematically shows the interaction of a control unit with actuators of a tape connecting device.

FIG. 5 shows the coordinated control of the wetting device 8, the clamping and cutting device 22, the joining device 14 and the holding device 15 by a control unit 59. Here, the control unit 59 preferably controls electronic valves 86, 87, 88, 89 which are associated with the pneumatic actuators 27, 41, 57 or the wetting device 8. However, it is also possible that differing actuators are used which e. g. directly transform an electric control signal into a force and a movement (e. g. an electric step motor or an electric drive).

Figure 6:
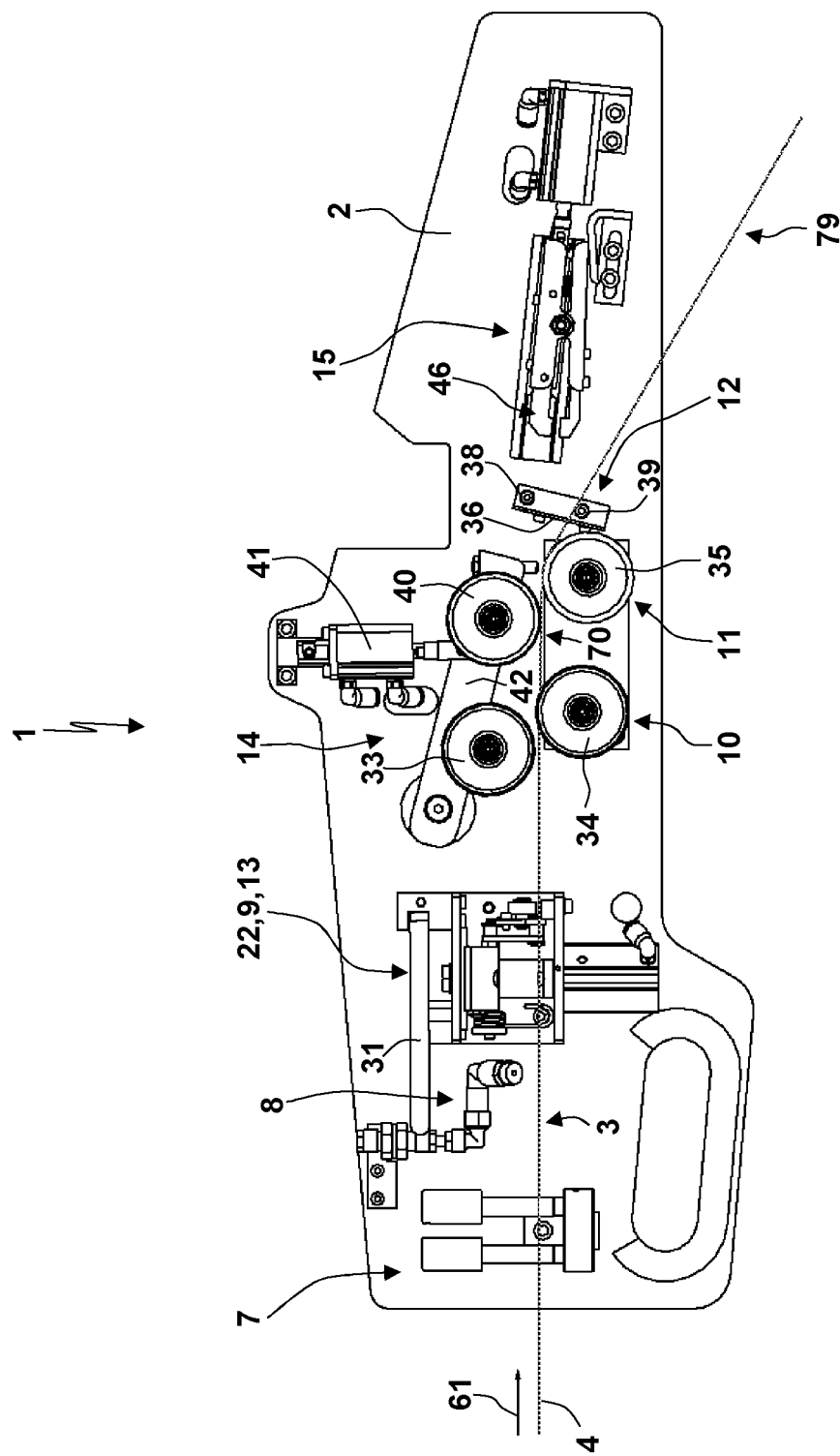
FIGS. 6 to 9 in a front view show the tape connecting device of FIG. 1 at different points in time during the execution of a method for connecting two tapes.
Figure 7:
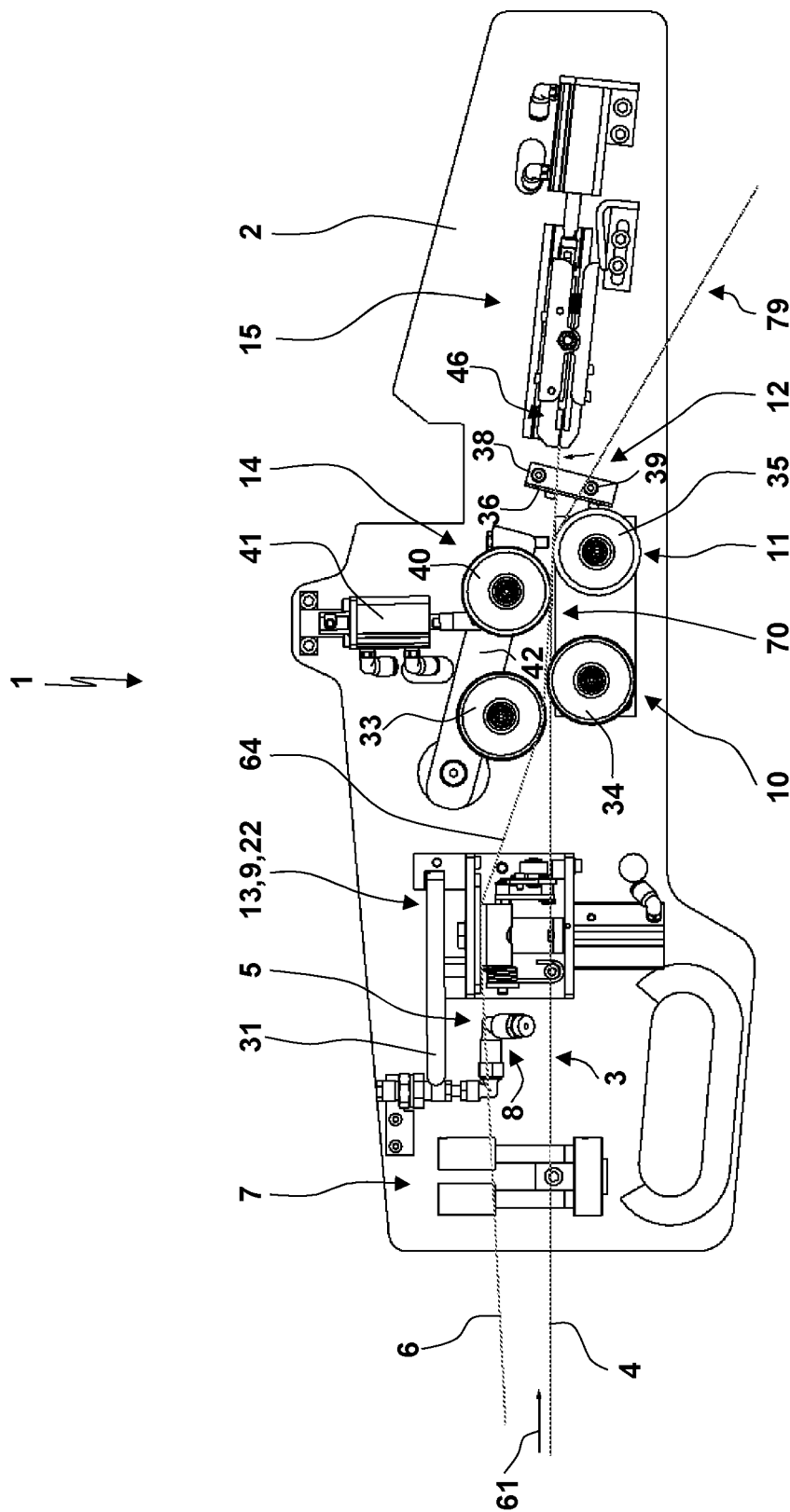
Figure 10:
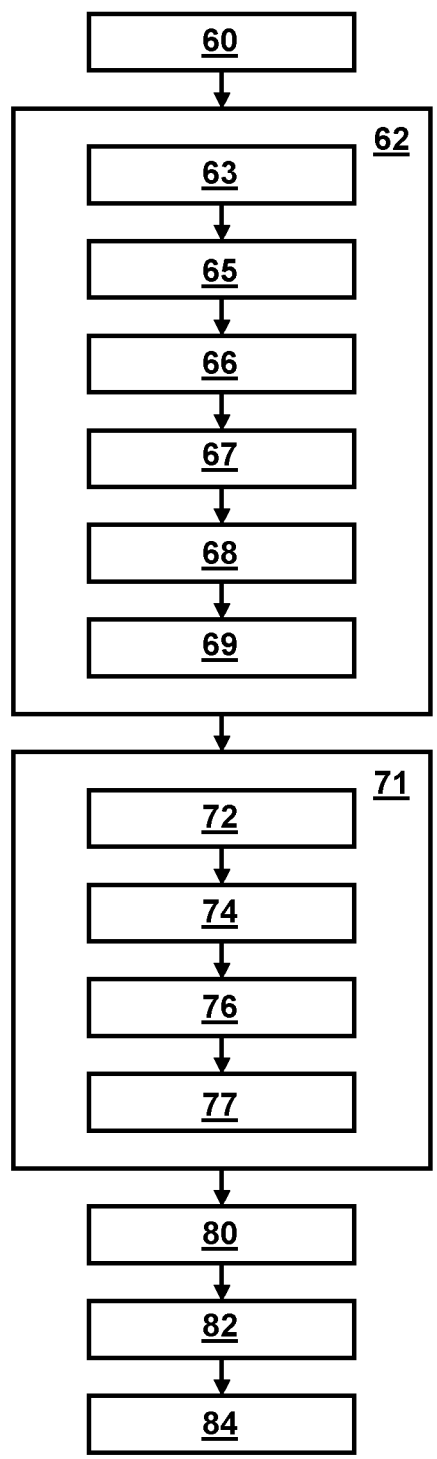
FIG. 10 schematically shows the sequence of a method for connecting two tapes.

FIGS. 6 to 9 show the method for connecting the tapes 4, 6 executed by the tape connecting device 1 in different method steps. Here, the method is explained on the basis of the method flowchart of FIG. 10:

In a method step 60 for which the tape connecting device 1 is shown in FIG. 6 the first tape 4 is conveyed along the conveying path 3 with a conveying movement 61 through the tape connecting device 1 and supplied to a downstream processing device.

In a method step 62 the second tape 6 is inserted or introduced into the tape connecting device 1. The method step 62 can already be executed before the start of the conveying operation for the first tape 4 so that on the one hand the first tape 4 is inserted into the tape connecting device 1 and on the other hand the second tape 6 is inserted into the tape connecting device 1 and already prior to the start of the conveying operation for the first tape 4 measures are taken for a later change from the conveying of the first tape 4 to the conveying of the second tape 6. However, it is also possible that the second tape 6 is inserted when the first tape 4 has been conveyed for a predefined time interval, a predefined and in some cases measured length of the first tape 4 has been conveyed or an end section 78 of the first tape 4 is approaching.

The method step 62 comprises a method step 63 wherein first the clamping device 46 is taken from the holding device 15 and a free end of the start section 64 of the second tape 6 is clamped between the clamping surfaces 50, 51. This might e. g. be the case in the region of a bobbin on which the second tape 6 is wound. Then, the clamping device 46 is manually opened. The end is inserted between the clamping surfaces 50, 51 and with a removal of the manual actuation forces the clamping device 46 is transferred into the clamped state due to the bias by the clamping spring 49. Subsequently, the start section 64 of the second tape 6 is inserted into the tape connecting device 1. For that aim in a method step 65 the start section 64 is inserted into the guiding device 7. In a method step 66 the clamping device 13 is opened by a manual actuation of the manipulation lever 31 and the start section 64 is positioned between the clamping plate 24 and the clamping jaw 25. When removing the manual actuation force biasing the manipulation lever 31 the spring 26 closes the clamping jaw 25 so that the start section 64 is clamped by the clamping device 13. Here, there is no actuation of the cutting device 9 in an extent which causes a cutting of the first tape 4. In the method step 67 the start section 64 is positioned on the guiding roll 33. Here, the circumferential wrap angle of the guiding roll 33 is only a small number of degrees (in particular in the range of 1° to 10° or 2° to 6°) and the start section 64 is guided along the joining roll 40. In the method step 68 the start section 64 is guided by the guiding device 12. Finally, in a method step 69 the clamping device 46 is mounted or appended on or to the slide 53 or the holding device 15. In this inserted state the conveying path 3 is spaced apart from the path 5 so that there is an interspace between the two tapes 4, 6 at any location. The joining device 14 is in the inactive operating state so that in a working region 70 of the joining device 14 there is still a small gap between the tapes 4, 6. During all of the mentioned method steps the tape 4 is still continuously conveyed with a conveying movement 61 whereas the second tape 6 is not conveyed. Here, a rotation of the guiding roll 34 and/or the deflection roll 35 is caused by the friction with the first tape 4. However, it is e. g. also possible that the deflection roll 35 is driven by a drive (here not shown).

Figure 8:
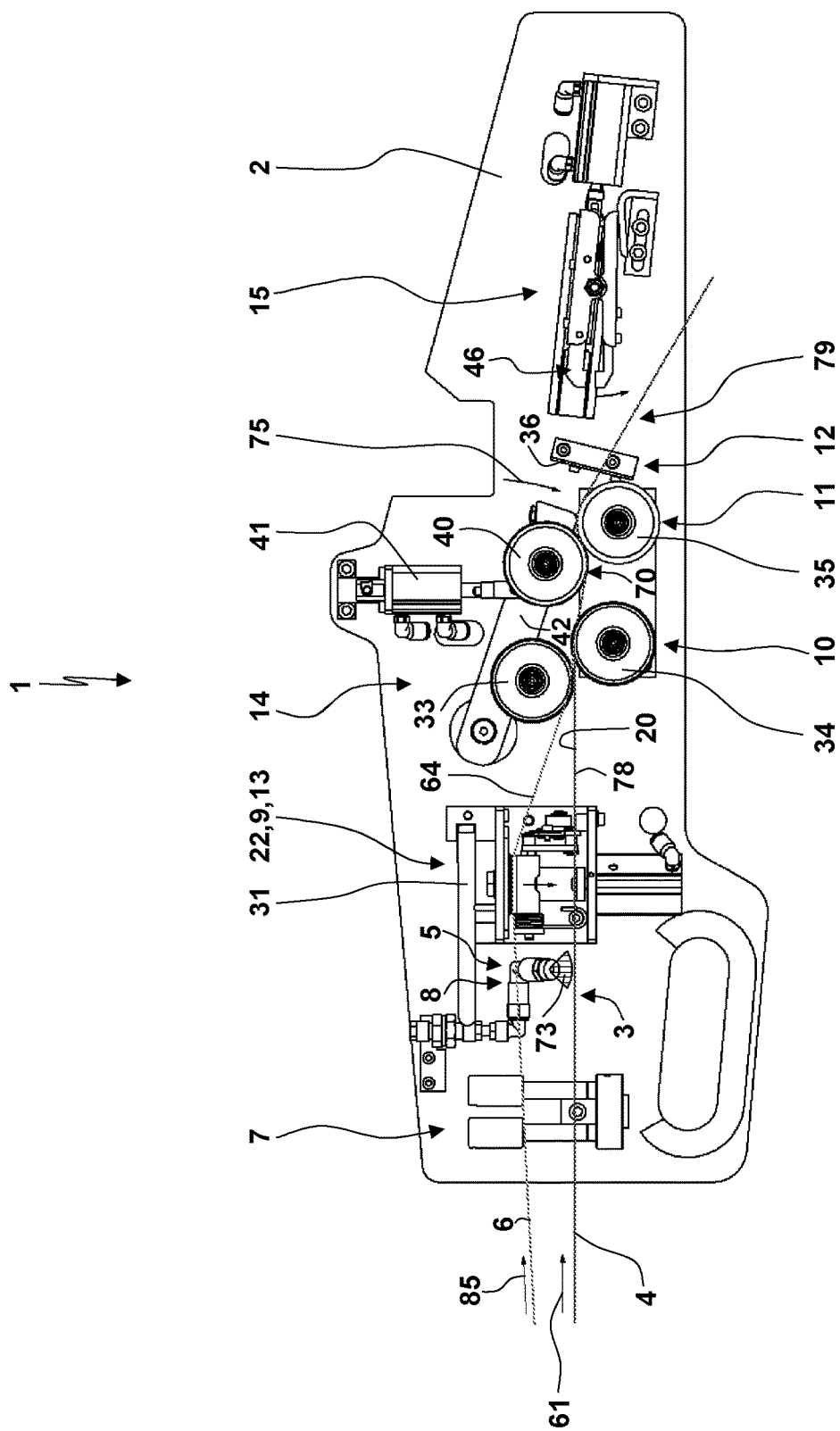
Figure 9:
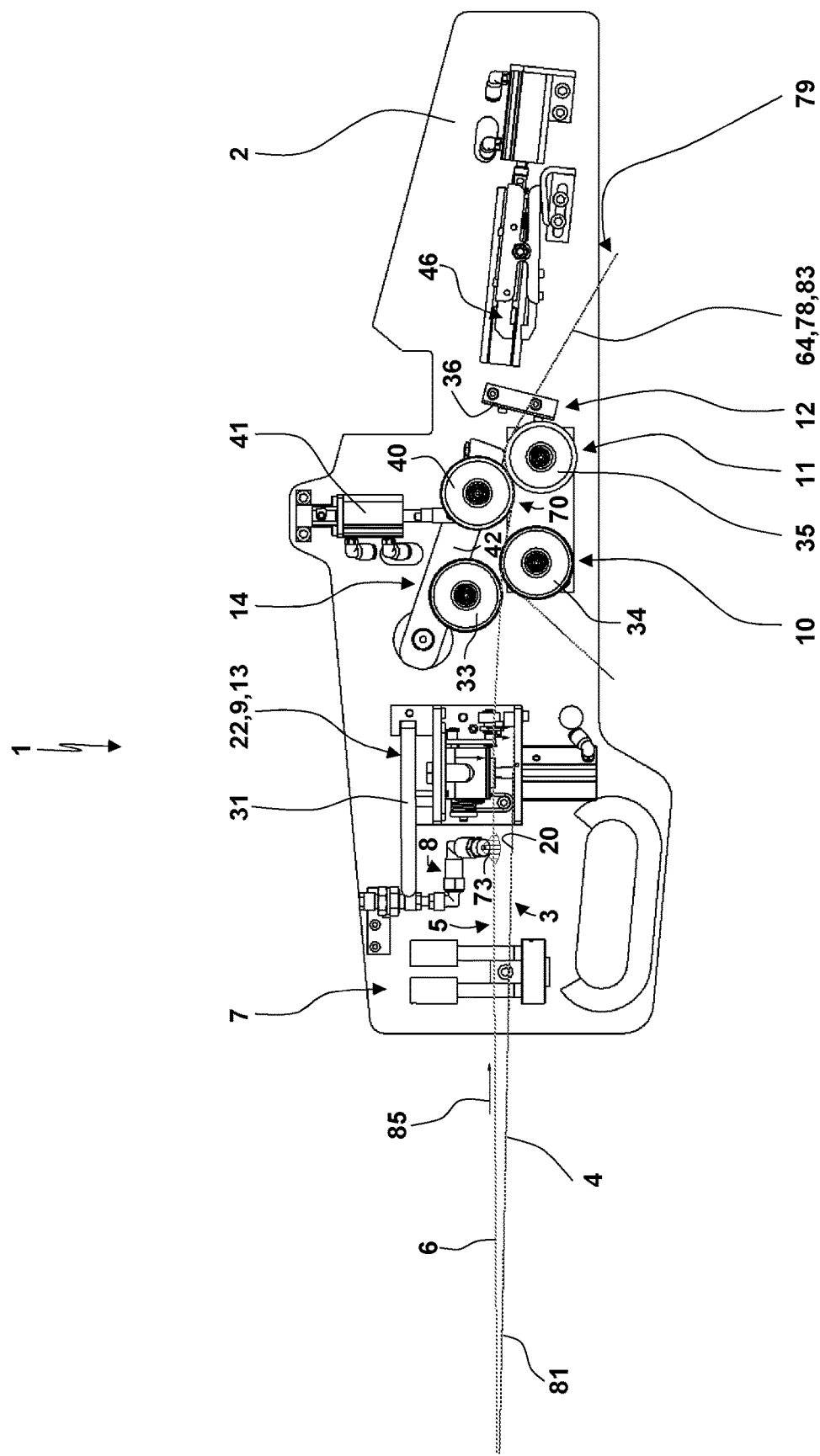

In the method step 71 the actual establishment of the adhesive connection of the tapes 4, 6 is provided (cp. FIG. 8):

For this purpose first in a method step 71 the wetting device 8 is controlled (in particular by the control unit 59 via valve 86) in a way such that the wetting device 8 applies the liquid 73 so that a wetting 20 is generated on the first tape 4 on the side facing towards the second tape 6.

When the section of the first tape 4 comprising the wetting 20 approaches the working region 70 of the joining device 14, in a method step 74 the joining device 14 is actuated (in particular by the control unit 59 via the valve 88) which leads to the result that the pivot lever 42 is pivoted in pivoting direction 75. This leads to the result that the joining roll 40 contacts the outer surface of the deflection roll 35 with the friction rings 44, 45. Due to the friction contact established in this way the joining roll 40 starts to rotate. The heights of the friction rings 44, 45 and the elasticity are chosen such that it is possible to position the second tape 6 on the first tape 4 comprising the wetting 20 between the outer surface of the tape guiding surface 43 and the outer surface of the deflection roll 35 and to press the second tape 6 on the first tape 4. A requirement for allowing a movement of the second tape 6 in longitudinal direction is the release by the holding device 46 and the clamping device 13. Due to the adhesion provided by the wetting 20 the second tape 6 is taken along by the first tape 4 which might immediately be the case or be the case after an increasing acceleration of the second tape 6 with a reducing slip. Initially, the first tape 4 only applies a pulling force. With the start of the movement of the second tape 6 the guiding roll 33 is also rotated due to the contact force and the wrapping.

Shortly before, at the same time or shortly after the joining the actuator 57 is actuated in a method step (in particular by the control unit 59 and the valve 89) in a way such that the clamping device 46 is transferred into the non-clamping state so that the free end of the second tape 6 is released and able to fall down due to its own weight onto the first tape 4. In order avoid that the second tape 6 comes to rest horizontally besides the first tape 4 the second tape 6 can be guided in horizontal direction by the guiding device 12.

Furthermore, before, at the same time or shortly after the joining the clamping device 13 is (in particular by the control of the valve 87 by the control unit 59) transferred into the released state. For this purpose, the actuator 27 runs through the first stroke part. Also in the released state of the clamping device 13 the clamping device 13 still holds the second tape 6 with a distance above the first tape 4 so that the tapes 4, 6 are only joined in the working portion 70 of the joining device 14. After the establishment of the connection for the shortest possible time span and for a small length of the section of the tape string a connecting section of the tape string is supplied to the processing device located downstream from the tape connecting device 1. In the connecting section the start section 64 of the second tape 6 lies on the end section 78 of the first tape 4. The start section 64 and the end section 78 are connected to each other in an adhesive way by the wetting 20. The supply of the connecting section to the processing device ends when the free end of the end section 48 of the first tape 4 has been reached. However, it is advantageous if the connecting section wherein the tapes 4, 6 overlap is as short as possible.

In an optional method step 80 a no longer required residual end 81 of the first tape 4 can be severed by the cutting device 9 at a location downstream from the connecting section. The length of the connecting section is dimensioned for providing the required adhesive effect. Here, by the control unit 59 the actuator 27 controls the clamping and cutting device 22 for executing also the second stroke part. At the end of the second stroke part the cutting knife 28 has severed the first tape 4.

Finally, in a method step 82 the second tape 6 is released by the clamping device 13 in a way such that the second tape 6 is able to replace the first tape 4 in the normal conveying operation of FIG. 6 so that the second tape 6 is moved along the conveying path 3 and the second tape 6 becomes the first tape 4 for a possible later connecting process with another tape. At the same time or shortly before or later the control unit 59 controls the joining device 14 back into the inactive operating state wherein there is no frictional contact of the joining roll 40 with the deflection roll 35.

It is possible that there is only one single connection of a first tape 4 to a second tape 6. However, it is also possible that this process is again repeated for each arrival of an end of a tape so that a tape string 79 is produced having a length being a multiple of the length of a tape 4, 6.

By means of the method it is in particular possible to connect the tapes 4, 6 without the use of any auxiliary means or additives which is not used in the process (so e. g. an adhesive strip, an adhesive, a stitching thread and the like). Instead, it is possible that the liquid 73 is water which is anyway used in the processing process or which is volatile without any residuals.

Furthermore, the method intends to allow that it is possible to simultaneously connect parallel pairs of tapes to each other under the coordination by the control unit 59 or by a plurality of control units communicating with each other or forming a network with each other.

It is possible that the wetting device 8 comprises a nebulizer or atomizer or sprayer for the liquid which might comprise the nozzle 21 or might have any other design.

The wetting 20 of the first tape 4 might be provided in a way such that and the pressing of the tapes 4, 6 against each other in the region of the joining device 14 might be such that besides the liquid there is nothing else (in particular no air) arranged between the tapes 4, 6.

It is possible that the joining roll 40 and/or the deflection roll 35 are resilient.

It is possible that the joining device 14 can be transferred (by the control unit 59 or in some cases also manually) into an extended open state besides the above mentioned operating states of the joining device 14. In the extended open state the insertion of the second tape is eased.

It is possible that the deflection roll comprises a material having a high density or comprises additional rotating weights or masses so that the deflection roll 35 has a higher moment of inertia than the joining roll 40 (e. g. at least 1.5 times higher, at least 2 times higher, at least 3 times higher or at least 5 times higher). Accordingly, the acceleration of the joining roll 40 can be induced by the higher moment of inertia of the deflection roll 35. It is also possible that any of the rolls 33, 34, 35, 40 is driven by an additional drive for assisting the conveying movement.

Optionally, in a method step 84 a (e. g. colored) identification can be provided by applying a paint on the connecting section 83 so that after the supply of the connecting section 83 to the processing process the later sorting out of products which have been produced in the processing process and wherein the connecting section 83 is arranged can be simplified.

In the case that the actuator 22 is a pneumatic actuator a separation of the two stroke parts can be achieved by different pressure levels when actuating the pneumatic actuator 27 so that a corresponding pressure control device can be used.

With the acceleration of the second tape 6 the second tape 6 is moved with a conveying movement 85 which with the decreasing slip more and more corresponds to the velocity of the conveying movement 61.

The small cylindrical outer surfaces of the friction rings 44, 45 form follower surfaces which are taken along by the outer surface of the deflection roll 35.

Due to the radial dimension of the friction rings 44, 45 a gab establishes between the outer surface of the deflection roll 35 and the outer surface of the tape guiding surface 43. The gap reduces the holding force of the second tape 6 on the joining roll 40. A normal force biasing the tapes 4, 6 between the deflection roll 35 and joining roll 40 can be defined by constructive measures by the choice of the elasticity of the joining roll 40, of the friction rings 44, 45 and/or the deflection roll 35 as well as by the radial dimensions of the friction rings 44, 45.

In the description and in the patent claims reference is made to a parallel operation of a plurality of tape connecting devices 1a, 1b, . . . for the simultaneous provision of a plurality of tape strings 79a, 79b, . . . to a common processing process or a plurality of parallel processing processes. Here, for the same components of the different parallel devices the same reference numerals have been used where the corresponding devices operated parallel to each other are then distinguished from each other by an additional letter a, b, . . . .

The width of the tapes 4, 6 is preferably in the range of 0.5 mm to 20 mm or in the range of 1 mm to 12 mm. For the two given ranges the thickness of the tapes 4, 6 might be in the range of 5 µm to 80 µm or in the range of 10 µm to 60 µm.

For an alternative to the above described embodiment it is possible that one and the same (then multifunctional) valve can be used for controlling the pneumatic actuator 27 for the clamping device 13 and for controlling the pneumatic actuator 41 for the control of the joining device 14. In this case the pneumatic design is chosen in a way such that the same pneumatic pressure controlled by the multifunctional way is sufficient for switching the joining device 14 from the inactive operating state into the active operating state and at the same time transferring the clamping device 13 into the non-clamping operating state without an opening of the clamping device 13 into the further opened operating state and so also for an actuation of the cutting device 9. In this case the cutting of the excessive end section of the first tape 4 after the establishment of the adhesive connection can be induced by a manual actuation of the manipulation lever 31.

The second tape 6 is positioned by hand during the running process when the first tape 4 has not ended yet. It is not required that the manufacturing process of the paper is interrupted. The sections wherein the tapes 4, 6 are lying one above the other are marked and sorted out at a later point in time.

Many variations and modifications may be made to the preferred embodiments of the invention without departing substantially from the spirit and principles of the invention. All such modifications and variations are intended to be included herein within the scope of the present invention, as defined by the following claims.

We claim:

1. A tape connecting device comprising
  a) a first conveying path for a first tape and
  b) a second path for a second tape,
  c) a wetting device by which the first tape and/or the second tape is wet by a liquid in a connecting section, the liquid being water,
  d) a joining device adapting the first conveying path and/or the second path, the joining device
    da) positioned downstream of the wetting device such that at least one of a start section of the second tape and an end section of the first tape are wetted prior to contacting each other,
    db) comprising an inactive operating state wherein in a working region of the joining device the first conveying path for the first tape and the second path for the second tape are arranged with a distance from each other and
    dc) comprising an active operating state wherein the first conveying path for the first tape and the second path for the second tape are joined to each other in a working region of the joining device so that the start section of the second tape and the end section of the first tape contact each other in the connecting section so that an adhesive connection between the start section of the second tape and the end section of the first tape is established in the connecting section due to the wetting with the liquid, and
  e) a cutting device positioned upstream of the joining device to cut a residual end of the first tape after the adhesive connection between the start section of the second tape and the end section of the first tape is established in the connecting section,
  f) wherein the adhesion of the liquid provides a force for accelerating the second tape so that the first tape takes along the second tape leading to a continuously reducing slip between the second tape relative to the first tape.

2. The tape connecting device of claim 1 comprising at least one of
  a) a holding device, and
  b) a clamping device.

3. The tape connecting device of claim 2, wherein at least one electronic control unit is provided which comprises control logic for controlling an actuation of at least one of
a) the holding device for holding an end of the second tape,
b) the clamping device for clamping the second tape,
c) the wetting device for wetting the first tape,
d) the joining device and
e) the cutting device for cutting the residual end of the first tape.

4. The tape connecting device of claim 3, wherein a pneumatic actuator is provided which actuates at least one of the holding device, the clamping device, the wetting device, the joining device and the cutting device.

5. The tape connecting device of claim 4, wherein it is possible to actuate at least one of the holding device and the clamping device both by the control unit and manually.

6. A method for connecting an end section of a first tape to a start section of a second tape for building a tape string comprising at least the first tape and the second tape, the tape string being supplied to a processing process, the method comprising the following method steps:
a) wetting at least one of the first tape and the second tape with a liquid, the liquid being water,
b) positioning the wetted at least one of the first tape and the second tape one above the other,
c) connecting the end section of the first tape to the start section of the second tape by an adhesion of the liquid arranged between a lower side of the end section of the first tape and an upper side of the start section of the second tape so that a tape string comprising the first tape and the second tape is built, wherein the end section of the first tape is not cut during the step of connecting the end section of the first tape to the start section of the second tape, and wherein the start section of the second tape is not cut during the step of connecting the end section of the first tape to the start section of the second tape, and
d) supplying the tape string to the processing process without a stop,
e) wherein the adhesion of the liquid provides a force for accelerating the second tape so that the first tape takes along the second tape leading to a continuously reducing slip between the second tape relative to the first tape.

* * * * *